(12) United States Patent
Knight et al.

(10) Patent No.: US 10,954,045 B2
(45) Date of Patent: Mar. 23, 2021

(54) THREAD PROTECTOR FOR TUBULAR MEMBERS

(71) Applicant: G&H Diversified Manufacturing LP, Houston, TX (US)

(72) Inventors: Benjamin Vascal Knight, Houston, TX (US); James Edward Kash, Houston, TX (US)

(73) Assignee: G&H Diversified Manufacturing LP, Houston, TX (US)

( * ) Notice: Subject to any disclaimer, the term of this patent is extended or adjusted under 35 U.S.C. 154(b) by 125 days.

(21) Appl. No.: 16/002,646

(22) Filed: Jun. 7, 2018

(65) Prior Publication Data

US 2019/0375564 A1 Dec. 12, 2019

(51) Int. Cl.
  *F16L 57/00* (2006.01)
  *B65D 59/06* (2006.01)

(52) U.S. Cl.
  CPC ............ *B65D 59/06* (2013.01); *F16L 57/005* (2013.01)

(58) Field of Classification Search
  CPC ............................... F16L 57/005; B65D 59/06
  USPC ................................................... 138/96 T, 89
  See application file for complete search history.

(56) References Cited

U.S. PATENT DOCUMENTS

| | | | | |
|---|---|---|---|---|
| 932,766 A * | 8/1909 | Daniels | ................. | E21B 33/134 166/135 |
| 1,749,162 A * | 3/1930 | Scott | ...................... | B65D 59/00 138/96 T |
| 2,092,535 A * | 9/1937 | Schnorr | ................. | B65D 59/02 138/96 T |
| 3,107,696 A * | 10/1963 | Ver Nooy | ........... | F16L 55/1283 138/89 |
| 3,307,552 A * | 3/1967 | Strawn | .................. | A61M 39/20 604/256 |
| 3,618,809 A * | 11/1971 | Martino | ................. | B65D 39/12 220/235 |
| 3,825,146 A * | 7/1974 | Hirmann | ................ | B65D 39/12 220/234 |
| 3,991,446 A * | 11/1976 | Mooney | ............... | H02G 3/0616 411/548 |
| 4,553,567 A * | 11/1985 | Telander | ................ | B65D 59/02 138/96 T |
| 4,682,707 A * | 7/1987 | Wiles | .................. | B65D 43/0272 220/789 |
| 5,048,571 A * | 9/1991 | Ellis | ....................... | B65D 59/06 138/96 R |
| 5,628,601 A * | 5/1997 | Pope | .................. | F01M 11/0408 411/383 |
| 6,032,694 A * | 3/2000 | Wellen | .................. | B65D 59/02 138/89 |
| 6,032,695 A * | 3/2000 | Wellen | .................... | B63B 17/04 138/89 |
| 6,142,186 A * | 11/2000 | Donovan | ............ | F16B 25/0021 138/89 |

(Continued)

*Primary Examiner* — James F Hook
(74) *Attorney, Agent, or Firm* — Conley Rose, P.C.

(57) ABSTRACT

A thread protector for coupling with an end of a tubular member includes a hub, a connector extending from the hub, and a plurality of splines formed on an outer surface of the connector and configured to releasably couple with a threaded connector of the tubular member, wherein each spline includes an inclined shoulder disposed at an acute angle to a central axis of the thread protector, and a locking shoulder disposed orthogonal to the central axis of the thread protector.

21 Claims, 5 Drawing Sheets

(56) References Cited

U.S. PATENT DOCUMENTS

| | | | | | |
|---|---|---|---|---|---|
| 6,196,270 | B1* | 3/2001 | Richards | ............... | B65D 59/02 |
| | | | | | 138/96 R |
| 6,757,950 | B2* | 7/2004 | Malone | ............... | F16L 37/0987 |
| | | | | | 138/109 |
| 7,281,546 | B2* | 10/2007 | Goodson | ............... | F16L 57/005 |
| | | | | | 138/89 |
| 2002/0066490 | A1* | 6/2002 | Brewis | ................. | F16L 55/136 |
| | | | | | 138/89 |
| 2008/0223473 | A1* | 9/2008 | Palmer | ............... | F16L 55/1157 |
| | | | | | 138/96 T |
| 2011/0203698 | A1* | 8/2011 | De Diego Reyes | ... | B65D 59/06 |
| | | | | | 138/96 T |
| 2011/0265904 | A1* | 11/2011 | Baker | .................... | B65D 59/02 |
| | | | | | 138/96 T |
| 2012/0192980 | A1* | 8/2012 | Williams | ................ | F16L 55/11 |
| | | | | | 138/89 |
| 2013/0105028 | A1* | 5/2013 | Lockard | ................. | F16L 57/005 |
| | | | | | 138/96 T |
| 2015/0369689 | A1* | 12/2015 | Kotlyar | ............... | F16L 55/1283 |
| | | | | | 73/49.8 |

\* cited by examiner

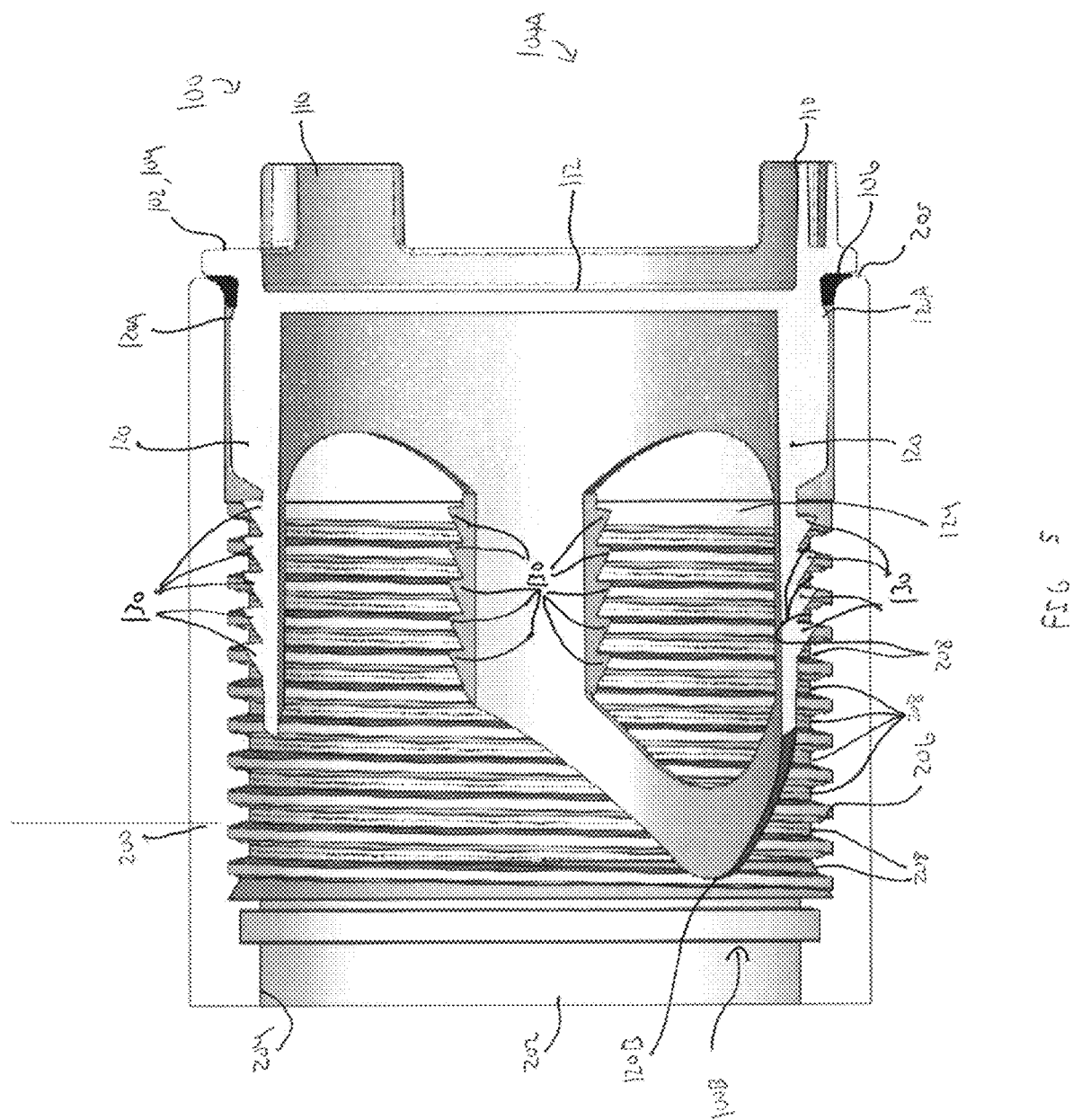

10,954,045 B2

THREAD PROTECTOR FOR TUBULAR MEMBERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Well systems configured include drilling, completion, and production systems that utilize tubular members to extract hydrocarbons from a subterranean earthen formation. For example, in the case of drilling systems, a drill bit is attached to the lower end of a drill stem composed of lengths of tubular drill pipe and other components joined together by tool joints with rotary shouldered threaded connections. The tubular members utilized by well systems often include a central bore or passage defined by a cylindrical inner surface. The tubular members may also include a pair of releasable or threaded connectors formed on the inner surface of the tubular member at each end thereof for threadably with other tubular members of the well system.

The tubular members of well systems may be used as a conduit for fluid transport into and out of the well and/or as a housing for tools transportable into and out of the well. For example, in drilling systems a drill bit may be attached to the lower end of a drill string composed of lengths of tubular drill pipe and other components joined together by tool joints with rotary shouldered threaded connections (RSTCs). The tubular members that make up a drill string may also be substituted with other rods, shafts, or other cylindrical members that may be used at the surface and which may require a releasable connection. The drill string may include threads that are engaged by right hand and/or left hand rotation. As another example, completion systems may include work strings (e.g., coiled tubing, etc.) or tool assemblies suspended in a well from a cable (e.g., wireline) comprising tubular members that house tools for performing tasks in the well. For instance, some completion systems may utilize perforating guns comprising shaped charges disposed in a tubular housing, the tubular housing being threadably connected with adjacently disposed tubular members via threaded connectors disposed on an inner surface of the tubular housing. Of course, tubular members comprising internally and/or externally threaded surfaces may be used in a variety of applications beyond well systems.

Tubular members are transported to the well site of the well system where they may be assembled to form the strings and tools described above for performing various tasks required by the well system. Tubular members may also be stored at an offsite storage location prior to being transported to the well site of a well system for use. During storage and/or transport the axial ends of the tubular member may be covered and/or sealed to prevent moisture and debris (e.g., dirt, grime, etc.) from contacting the inner surface of the tubular member. For instance, threaded connectors of the tubular member may be protected from moisture and debris during transport and storage of the tubular member so that the threaded connectors do not corrode or become otherwise damaged prior to use at the well site.

BRIEF SUMMARY OF THE DISCLOSURE

An embodiment of a thread protector for coupling with an end of a tubular member comprises a hub; a connector extending from the hub; and a plurality of splines formed on an outer surface of the connector and configured to releasably couple with a threaded connector of the tubular member, wherein each spline comprises an inclined shoulder disposed at an acute angle to a central axis of the thread protector; and a locking shoulder disposed orthogonal to the central axis of the thread protector. In some embodiments, the splines of each connector are configured to restrict the thread protector from being removed from the tubular member in response to the application of a second axially directed force against the thread protector. In some embodiments, the connector has a first end adjoined to the hub and a second end distal the hub; and a stiffener positioned on the outer surface of the connector and spaced from the second end of the connector, wherein the stiffener is configured to increase a bending resistance of the connector. In certain embodiments, the connector has a maximum outer diameter located at the second end of the connector. In certain embodiments, the hub comprises an annular first face and an annular second face disposed opposite the first annular face; wherein the second annular face is configured to engage the end of the tubular member when the thread protector is coupled with the tubular member. In some embodiments, the thread protector further comprises castellations extending from the first face of the hub. In some embodiments, the hub comprises an enclosing plate configured to prevent debris from entering a central passage of the tubular member when the thread protector is coupled with the tubular member. In certain embodiments, each connector comprises a pair of arms with an opening positioned between the pair of arms. In certain embodiments, each arm comprises at least some of the plurality of splines.

An embodiment of a thread protector for coupling with an end of a tubular member comprises a hub; and a pair of circumferentially spaced connectors extending from the hub; wherein each connector comprises a pair of arms with an opening positioned between the pair of arms, and wherein each arm comprises a plurality of splines configured to releasably couple with a threaded connector of the tubular member; wherein the splines of each connector are configured to permit the thread protect to be inserted into the tubular member in response to the application of a first axially directed force against the thread protector; wherein the splines of each connector are configured to restrict the thread protector from being removed from the tubular member in response to the application of a second axially directed force against the thread protector. In some embodiments, the second axially directed force is opposite the first axially directed force. In some embodiments, the splines of each connector comprises an inclined shoulder disposed at an acute angle to a central axis of the thread protector; and a locking shoulder disposed orthogonal to the central axis of the thread protector. In certain embodiments, the plurality of splines of each connector comprises a plurality of arcuate splines. In certain embodiments, each connector has a first end adjoined to the hub and a second end distal the hub; and each arm of each connector comprises a stiffener spaced from the second end of the connector, wherein the stiffener is configured to increase a bending resistance of the connector. In some embodiments, the bending resistance of each connector is greater at the first end of the connector than at the second end of the connector. In some embodiments, each connector has a maximum outer diameter located at the second end of the connector. In some embodiments, the hub comprises an annular first face and an annular second face disposed opposite the first annular face; wherein the second annular face is configured to engage the end of the tubular member when the thread protector is coupled with the tubular member. In certain embodiments, the hub comprises an enclosing plate configured to prevent debris from entering a central passage of the tubular member when the thread protector is coupled with the tubular member.

An embodiment of a method for coupling a thread protector to an end of a tubular member comprises applying an axially directed force against the thread protector to insert the thread protector into the tubular member with splines of the thread protector sliding over threads of the tubular member; and rotating the thread protector 360 degrees or less relative to the tubular member to secure the thread protector to the tubular member. In some embodiments, a connector of the thread protector bends inwardly in response to inserting the thread protector into the tubular member.

BRIEF DESCRIPTION OF THE DRAWINGS

For a detailed description of exemplary embodiments of the disclosure, reference will now be made to the accompanying drawings in which:

FIG. 5 is a side cross-sectional view of the thread protector of FIG. 1 releasably coupled to an embodiment of a tubular member in accordance with the principles disclosed herein.

DETAILED DESCRIPTION

Figure 1:
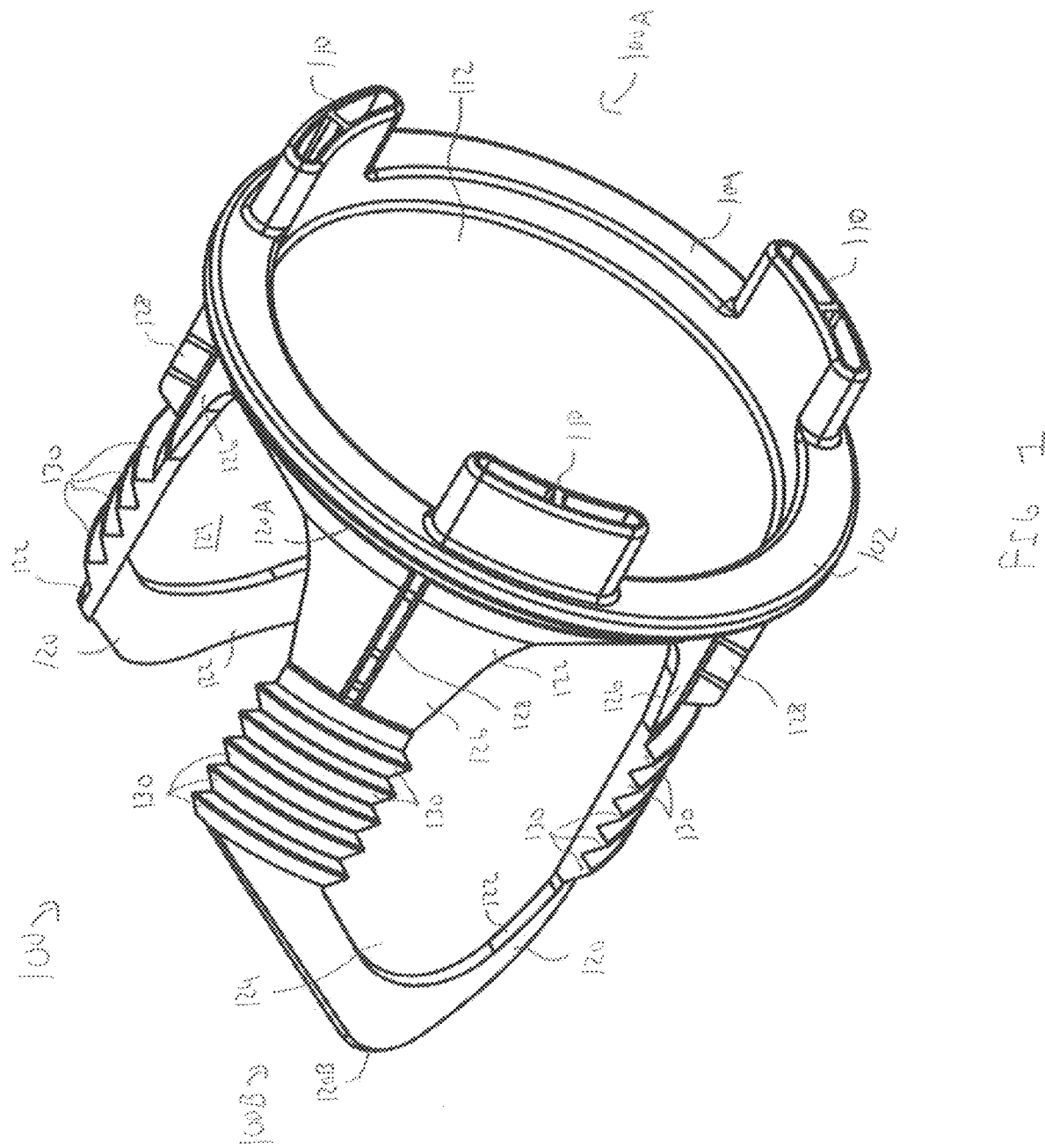
FIG. 1 is perspective view of a thread protector for a tubular member in accordance with the principles disclosed herein.
Figure 2:
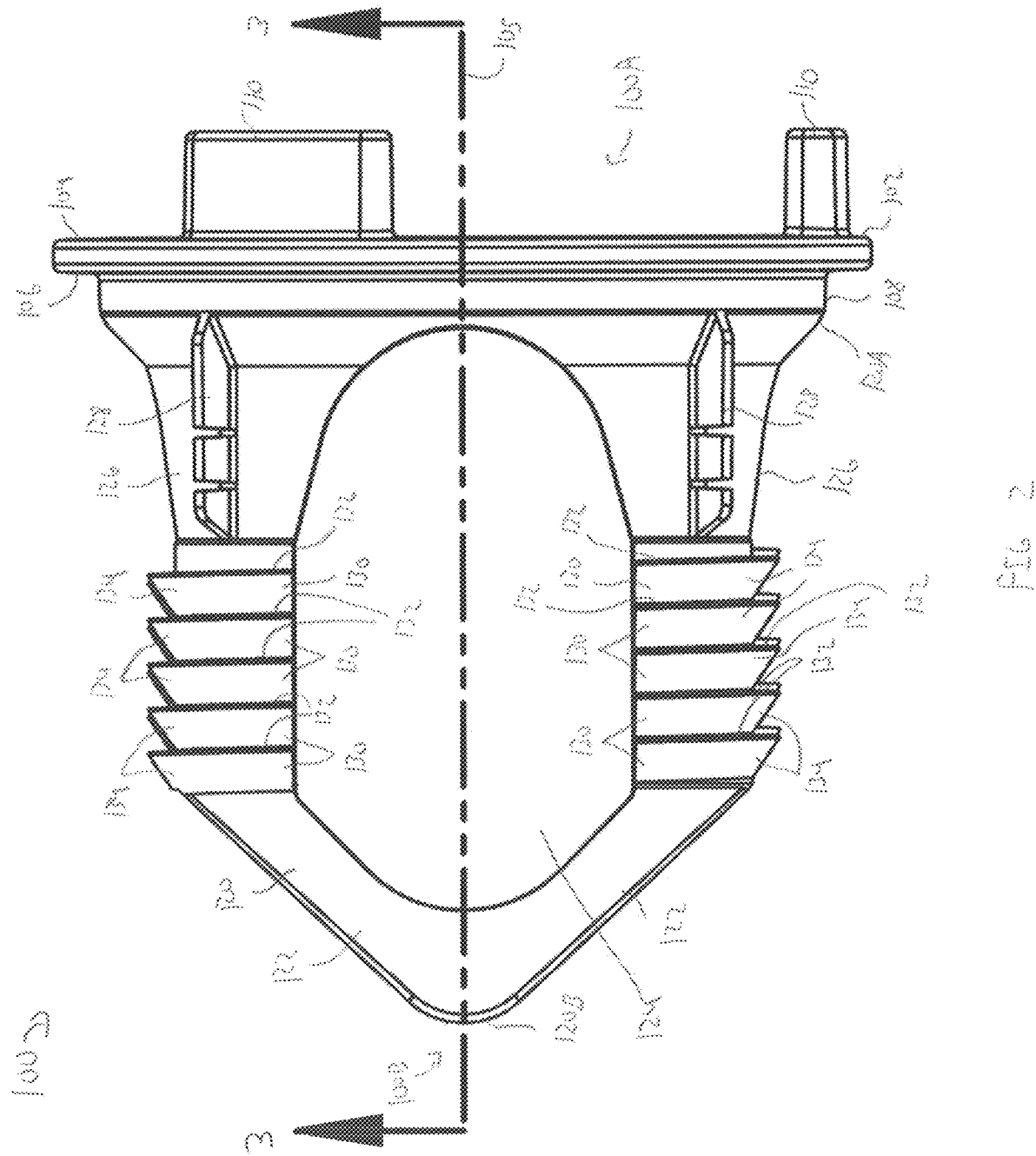
FIG. 2 is a side view of the thread protector of FIG. 1.
Figure 3:
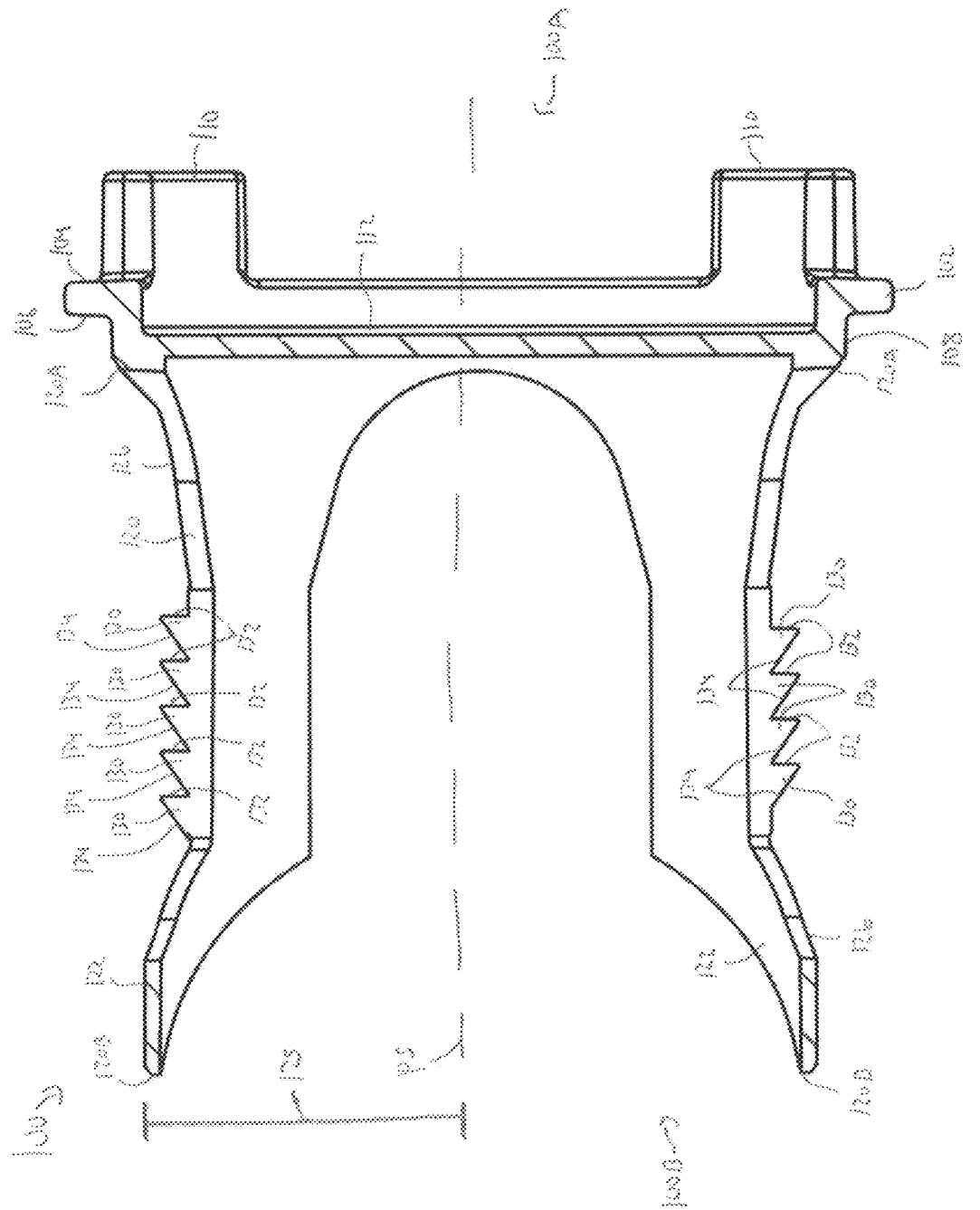
FIG. 3 is a cross-sectional view along lines 3-3 in FIG. 2 of the thread protector of FIG. 1.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. Further, the term "fluid," as used herein, is intended to encompass both fluids and gasses.

Referring to FIGS. 1-4, an embodiment of an endcap or thread protector 100 for a tubular member is shown in FIGS. 1-4. Thread protector 100 may be releasably secured to an end of a tubular member to restrict or prevent materials (e.g., moisture, dirt, grime, etc.) from entering a central passage or bore of the tubular member and thereby protect a cylindrical inner surface that defines the central passage of the tubular member. In this manner, thread protector 100 may protect features of the inner surface of the tubular member, including threads or threaded connectors formed on the inner surface, from corrosion or other damage that may occur thereto due to contact from moisture and/or debris. Additionally, thread protector 100 is configured to releasably couple with a releasable or threaded connector disposed on the inner surface of the tubular member in which thread protector 100 is received. As will be discussed further herein, thread protector 100 may be inserted axially into the central passage of the tubular member such that thread protector 100 requires less than a full rotation to be secured or locked to the threaded connector of the tubular member.

In the embodiment of FIGS. 1-4, thread protector 100 has a central or longitudinal axis 105, a first end 100A, a second end 100B disposed opposite first end 100A, and generally includes a generally cylindrical flange or hub 102 and a pair of circumferentially spaced, generally arcuate connectors 120. Hub 102 is positioned at first end 100A of thread protector 100 while connectors 120 extend axially from hub 102 to the second end 100B of thread protector 100. When thread protector 100 is received in the central passage of a tubular member the first end 100A of thread protector 100 comprises an outer end disposed adjacent an end of the tubular member while second end 100B of thread protector 100 comprises an inner end of thread protector 100 that is received in the central passage of the tubular member.

Hub 102 includes an annular first or front face 104 positioned at the first end 100A of thread protector 100, an annular second or rear face 106 positioned opposite front face 104, and a generally cylindrical outer surface 108 extending axially from rear face 106 towards the second end 100B of thread protector 100. In this embodiment, when thread protector 100 is coupled to an end of a tubular member with the second end 100B disposed within a central passage of the tubular member, outer surface 108 of hub 102 is positioned directly adjacent an inner surface of the tubular member. In some embodiments, thread protector 100 includes an annular seal (e.g., an O-ring seal, etc.) positioned on outer surface 108 that sealingly engages the inner surface of the tubular member when thread protector 100 is coupled to an end of the tubular member.

In this embodiment, the front face 104 of hub 102 includes a plurality of circumferentially spaced, arcuate castellations or handles 110, where each handle 110 extends axially from front face 104. Handles 110 assist with coupling and decoupling thread protector 100 with an end of a tubular member. Particularly, thread protector 100 may be rotated relative to the tubular member in a first rotational direction to secure thread protector 100 to the tubular member. Additionally, thread protector 100 may be rotated in a second rotational direction opposite the first rotational direction to unlock and remove thread protector 100 from the tubular member. Handles 110 provide locations at which torque may be applied by an operator of thread protector 100 (e.g., by hand or via a tool) to rotate thread protector 100 relative to the tubular member to rotationally lock thread protector 100 with the tubular member and remove thread protector 100 from the tubular member. In this embodiment, hub 102 also comprises an enclosing member or plate 112 that prevents moisture, debris (e.g., dirt, grime, etc.) or other materials from entering the central passage of the tubular member once thread protector 100 has been coupled to an end of the tubular member.

Connectors 120 of thread protector 100 are configured to releasably couple the thread protector 100 with a tubular member by coupling with a threadable connector disposed on an inner surface of the tubular member. Although in this embodiment thread protector 100 includes two connectors 120, in other embodiments, thread protector 100 may include different numbers of connectors 120, including a single connector 120. Each connector 120 has a first end 120A adjoin or affixed to an end of the outer surface 108 of hub 102, and a second or free end 120B opposite first end 120A that is positioned at the second end 100B of thread protector 100. In this embodiment, each connector 120 comprises a pair of arms 122 extending substantially between first end 120A and second end 120B, where an opening 124 is formed between each pair of arms 122 of the connector 120. Additionally, the arm 122 of each connector comprises an outer surface 126 that includes an elongate stiffener 128 extending radially outwards therefrom.

Particularly, the stiffener 128 of each arm 122 is positioned proximal first end 120A and distal second end 120B of the connector 120. Stiffeners 128 increase the resistance to bending of connectors 120 in a radially inwards direction relative to central axis 105. Additionally, given that stiffeners 128 are positioned proximal first end 120A and distal the second end 1206 of each connector 120, the resistance to bending of each connector 120 is greater proximal first end 120A than at second end 120B. Further, the opening 124 of each connector 120 reduces the bending resistance of the portion of each connector 120 positioned at or near second end 120B. In this configuration, the portion of each connector 120 proximal second end 120B will bend a greater amount or degree than the portion of the connector 120 proximal first end 120A radially inwards in response to the application of a radially inwards directed force against the connector 120.

The arms 122 of each connector 120 of the thread protector 100 include a plurality of arcuate splines or threads 130 formed on outer surface 126. In this embodiment, each spline 130 comprises a pair of adjoining shoulders: a first or locking shoulder 132 and a second or inclined shoulder 134. In this embodiment, each arm 122 includes five total splines 130 where each spline 130 is dimensioned at six splines 130 per inch; however, in other embodiments, the number of splines 130 of each connector 120 and/or the dimensions of each spline 130 may vary.

Figure 4:
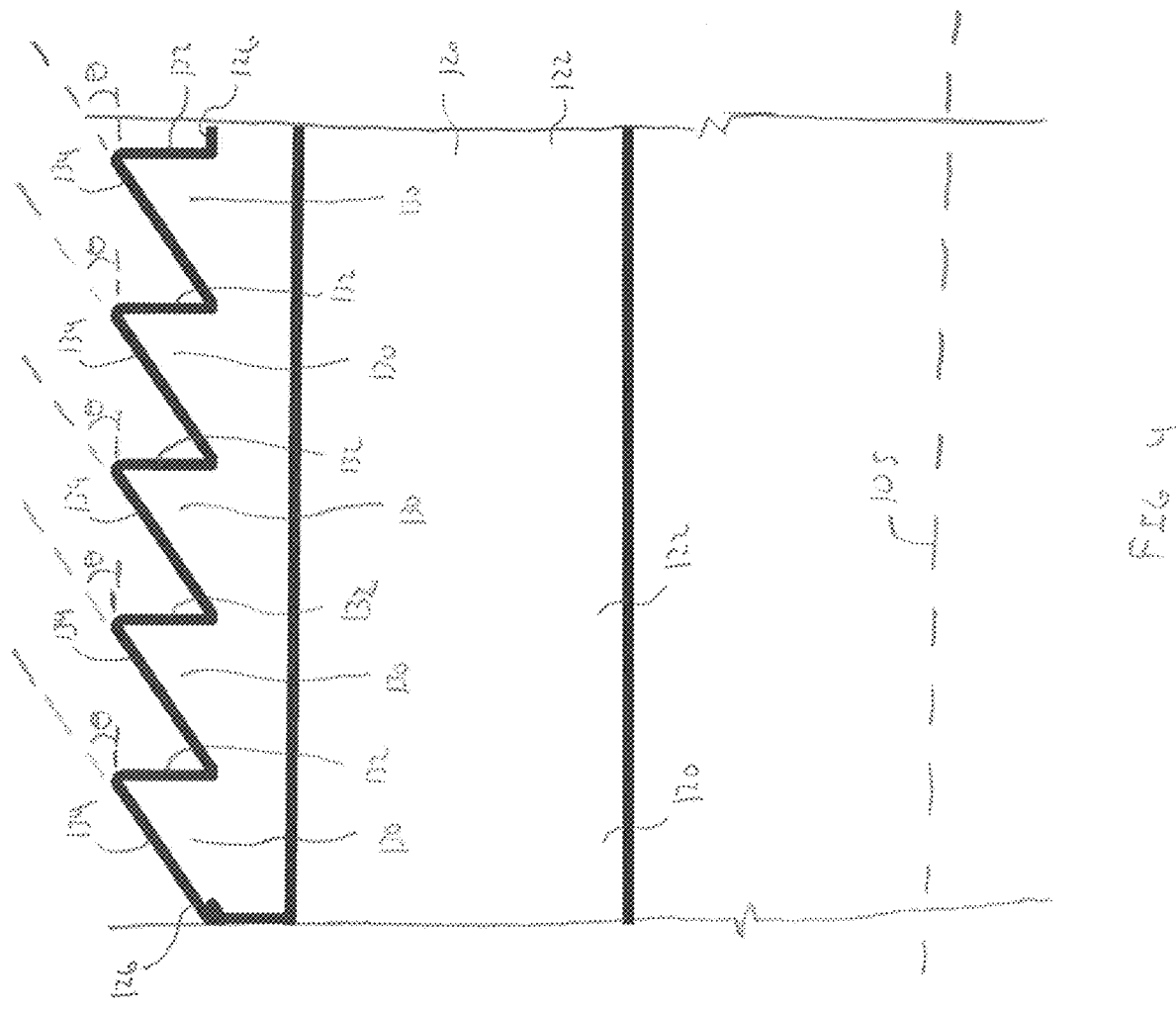
FIG. 4 is a zoomed-in view of an embodiment of a connector of the thread protector of FIG. 1 in accordance with the principles disclosed herein.

As shown particularly in FIG. 4, the locking shoulder 132 of each spline 130 is disposed substantially orthogonal (at an angle of approximately 90 degrees from) the central axis 105 of thread protector 100 while the inclined shoulder 134 of each spline 130 is disposed at an acute angle θ relative to central axis 105. In this embodiment, acute angle θ is approximately between 20-40 degrees; however, in other embodiments, acute angle θ of the inclined shoulder 134 of each spine 130 may vary. The inclined shoulders 134 of spines 130 are inclined relative to central axis 105 of thread protector 100 to permit thread protector 100 to be inserted axially into a central passage of a tubular member having a threaded inner surface until an axial end of the tubular member contacts the rear face 106 of hub 102, preventing further axial travel of thread protector 100 into the central passage of the tubular member.

Referring to FIGS. 1-5, thread protector 100 is shown releasably coupled to a tubular member 200 in FIG. 5. In the embodiment of FIGS. 1-5, tubular member 200 has a central bore or passage 202 defined by a generally cylindrical inner surface 204 that extends to a first terminal or axial end 205 of tubular member 200. Additionally, the inner surface 204 of tubular member 200 includes a releasable connector 206 comprising internal threads 208. In this embodiment, tubular member 200 comprises a drill pipe; however, in other embodiments, tubular member 200 may comprise other types of tubular members known in the art, including tubular housings or receptacles.

In this embodiment, each connector 120 of thread protector 100 has a maximum outer diameter or width at second end 120B (indicated by arrow 125 in FIG. 3) that is greater in diameter than the outer diameter of splines 130. In this configuration, as thread protector 100 is axially inserted into the central passage 202 of tubular member 200 the second end 120B of each connector 120 is flexed radially inwards towards central axis 105 in response to contact between the second ends 1206 of connectors 120 and the inner surface 204 of tubular member 200. Additionally, as thread protector 100 is axially inserted into tubular member 200, the inclined shoulders 134 of splines 130 slidingly contact the threads 208 positioned on the inner surface 204 of tubular member 200 without entering into interlocking or threaded engagement with threads 208. Instead, connectors 120 of thread protector 100 are permitted to flex radially inwards as the threads 208 of tubular member 200 slide against the inclined shoulders 134 of splines 130. In this manner, thread protector 100 may be inserted axially into the central passage 202 of tubular member 200 without rotating thread protector 100 relative to tubular member 200. In other words, thread protector 100 may be inserted into tubular member 200 in response to applying an axially directed (e.g., parallel with central axis 105) force against thread protector 100 in the direction of tubular member 200. In the inserted or releasably coupled position of thread protector 100 shown in FIG. 5, the central axis 105 of thread protector 100 may enter into axial alignment (or at least be disposed parallel with) a central or longitudinal axis of tubular member 200.

Once thread protector 100 has been fully inserted into the central passage of tubular member 200, with an axial end of tubular member 200 disposed directly adjacent or contacting the rear face of the hub 102 of thread protector 100, thread protector 100 may be rotated in the first rotational direction (e.g., clockwise) relative to tubular member 200 to threadably connector or secure thread protector 100 to tubular member 200. As described above, thread protector 100 may be rotated by applying a torque to handles 110 of the hub 102 of thread protector 100. In this embodiment, thread protector 100 may be rotated approximately between a quarter-turn to a full-turn (90 degrees to 360 degrees) relative to tubular member 200 to secure thread protector 100 thereto such that further rotation of thread protector 100 in the first rotational direction relative to tubular member 200 is restricted via threaded engagement between the threads of tubular member 200 and splines 130 of thread protector 100. Although in this embodiment thread protector 100 may be rotated a quarter-turn to a full-turn to lock against tubular member 200, in other embodiments, the amount of relative rotation between thread protector 100 and tubular member 200 required for locking thread protector 100 thereto may vary.

In some embodiments, with a first thread protector 100 secured to the first axial end 205 of tubular member 200, a second thread protector 100 may be secured to an opposite, second axial end (not shown in FIG. 5) of tubular member 200 in the same manner described above to protect internal threads positioned at each axial end of tubular member 200. With the threads 208 of tubular member 200 protected by one or more thread protectors 100, tubular member 200 may be stored or transported to a well site for use by a well system with the threads 208 of tubular member 200 being protected from damage by the one or more thread protectors 100 during said storage or transport. When it is desired to remove thread protector 100 from tubular member 200, thread protector 100 may be rotated in the second rotational direction (e.g., counterclockwise) until the splines 130 of thread protector 100 are fully unthreaded or disengaged from the threads 208 of tubular member 200. Given that locking shoulders 132 are disposed substantially orthogonal central axis 105, interlocking or threaded engagement between locking shoulders 132 and the threads 208 of tubular member 200 prevent thread protector 100 from being removed from tubular member 200 in response to the application of an axially directed force against thread protector 100 in a direction away from tubular member 200. Instead, thread protector 100 is rotated in the second rotational direction from its locked position until thread protector 100 is removed from tubular member 200. Thus, in some embodiments, thread protector 100 is rotated a plurality of full rotations (more than 360°) relative to tubular member 200 before thread protector 100 is removed therefrom.

As described above, thread protector 100 is configured such that it may be inserted into the central passage of a tubular member in response to applying an axially directed force against thread protector 100 in a first direction towards tubular member 200 but cannot be removed from tubular member 200 by applying an axially directed force against thread protector 100 in a second direction away from tubular member 200. Particularly, inclined shoulders 134 of splines 130, being disposed at an acute angle relative to the central axis 105 of thread protector 100, are permitted to slide against and over threads 208 of tubular member 200 whereas the substantially orthogonal locking shoulders 132 of splines 130 are not permitted to slide over the threads 208, and instead, lock against or threadably engage the threads 208.

Further, the amount of time required for inserting and securing thread protector to tubular member 200 (as well as other types of tubular members known in the art) is reduced by permitting thread protector 100 to be axially inserted into the central passage 202 of tubular member 200 without needing to rotate splines 130 of thread protector 100 along the total length of the threads 208 of tubular member 200 (as is done when thread protector 100 is removed from tubular member 200). In other words, instead of needing to fully thread each thread protector 100 with the threads 208 of tubular member 200 to secure the thread protector 100 therewith, thread protector 100 may simply be axially inserted fully into the central passage 202 of tubular member 200 and then rotated a limited degree relative to tubular member 200 (e.g., a full rotation or less) to fully secure thread protector 100 with tubular member 200. Given that, in at least some applications, large numbers of tubular members 200 may be stored or shipped at a time, and endcaps or thread protectors (e.g., thread protector 100) may be coupled to the tubular members 200 by hand, reducing the amount of time required for coupling thread protectors 100 to the tubular members 200 may result in substantial time savings for storing and transporting large numbers of tubular members 200.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure presented herein. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A thread protector for coupling with an end of a tubular member, comprising:
   a hub;
   a connector extending from the hub and comprising a first end coupled to the hub, and a second end opposite the first end; and
   a plurality of splines formed on an outer surface of the connector and configured to releasably couple with a threaded connector of the tubular member, wherein each spline comprises:
      an inclined shoulder disposed at an acute angle to a central axis of the thread protector; and
      a locking shoulder disposed orthogonal to the central axis of the thread protector and facing the hub, wherein the inclined shoulder is positioned opposite the locking shoulder
   wherein the connector comprises an outer diameter located between the plurality of splines and the second end of the connector that is greater than a maximum outer diameter of the plurality of splines and is configured to flex the plurality of splines inwardly upon insertion of the thread protector into the end of the tubular member.

2. The thread protector of claim 1, wherein the splines of the connector are configured to restrict the thread protector from being removed from the tubular member in response to the application of a second axially directed force against the thread protector.

3. The thread protector of claim 1, wherein:
   the connector has a first end adjoined to the hub and a second end distal the hub;

a stiffener positioned on the outer surface of the connector and spaced from the second end of the connector, wherein the stiffener is configured to increase a bending resistance of the connector; and the connector has a maximum outer diameter located at the second end of the connector.

4. The thread protector of claim 1, wherein the hub comprises:

an annular first face and an annular second face disposed opposite the first annular face; and castellations extending from the first face of the hub wherein the second annular face is configured to engage the end of the tubular member when the thread protector is coupled with the tubular member.

5. The thread protector of claim 1, wherein the hub comprises an enclosing plate configured to prevent debris from entering a central passage of the tubular member when the thread protector is coupled with the tubular member.

6. The thread protector of claim 1, wherein the connector comprises a pair of arms with an opening positioned between the pair of arms.

7. The thread protector of claim 1, wherein each arm comprises at least some of the plurality of splines.

8. The thread protector of claim 1, wherein the outer surface of the connector is unthreaded between the hub and the plurality of spines.

9. The thread protector of claim 1, wherein:

the connector has a first end adjoined to the hub and a second end distal the hub;

the plurality of splines are spaced from the second end of the connector; and the connector has a maximum outer diameter located at the second end of the connector.

10. A thread protector for coupling with an end of a tubular member, comprising:

a hub; and a pair of circumferentially spaced connectors extending from the hub;

wherein each connector comprises a pair of arms with an opening positioned between the pair of arms, and wherein each arm comprises a plurality of splines configured to releasably couple with a threaded connector of the tubular member;

wherein the splines of each connector are configured to permit the thread protect to be inserted into the tubular member in response to the application of a first axially directed force against the thread protector;

wherein the splines of each connector are configured to restrict the thread protector from being removed from the tubular member in response to the application of a second axially directed force against the thread protector.

11. The thread protector of claim 10, wherein the second axially directed force is opposite the first axially directed force.

12. The thread protector of claim 10, wherein the splines of each connector comprises:

an inclined shoulder disposed at an acute angle to a central axis of the thread protector; and a locking shoulder disposed orthogonal to the central axis of the thread protector.

13. The thread protector of claim 10, wherein the plurality of splines of each connector comprises a plurality of arcuate splines.

14. The thread protector of claim 10, wherein:

each connector has a first end adjoined to the hub and a second end distal the hub; and each arm of each connector comprises a stiffener spaced from the second end of the connector, wherein the stiffener is configured to increase a bending resistance of the connector.

15. The thread protector of claim 14, wherein the bending resistance of each connector is greater at the first end of the connector than at the second end of the connector.

16. The thread protector of claim 14, wherein each connector has a maximum outer diameter located at the second end of the connector.

17. The thread protector of claim 10, wherein the hub comprises:

an annular first face and an annular second face disposed opposite the first annular face;

wherein the second annular face is configured to engage the end of the tubular member when the thread protector is coupled with the tubular member.

18. The thread protector of claim 10, wherein the hub comprises an enclosing plate configured to prevent debris from entering a central passage of the tubular member when the thread protector is coupled with the tubular member.

19. The thread protector of claim 10, wherein an outer surface of each connector is unthreaded between the hub and the plurality of spines.

20. A method for coupling a thread protector to an end of a tubular member, comprising:

applying an axially directed force against the thread protector to insert the thread protector into the tubular member with a plurality of splines formed on an outer surface of a connector of the thread protector sliding over threads of the tubular member, wherein the connector comprises a first end coupled to a hub of the thread protector and a second end opposite the first end; and rotating the thread protector 360 degrees or less relative to the tubular member to secure the thread protector to the tubular member in response to threaded engagement between the splines and the threads of the tubular member, wherein the connector comprises an outer diameter located between the plurality of splines and the second end of the connector that is greater than a maximum outer diameter of the plurality of splines and which flexes the plurality of splines inwardly upon insertion of the thread protector into the end of the tubular member.

21. The method of claim 20, wherein further rotation of the thread protector in a first rotational direction is restricted following the rotation of the thread protector 360 degrees or less relative to the tubular member.

* * * * *